(12) United States Patent
Odorfer et al.

(10) Patent No.: US 7,587,205 B1
(45) Date of Patent: Sep. 8, 2009

(54) SPECIFICATION OF A COMMUNICATION SYSTEM FOR MOBILE TELECOMMUNICATIONS

(75) Inventors: Thomas Odorfer, Munich (DE); Gerhard Mayrhofer, Munich (DE)

(73) Assignee: VIAG Interkom GmbH & Co., Munich (DE)

( * ) Notice: Subject to any disclaimer, the term of this patent is extended or adjusted under 35 U.S.C. 154(b) by 0 days.

(21) Appl. No.: 09/936,779

(22) PCT Filed: Mar. 17, 2000

(86) PCT No.: PCT/EP00/02411

§ 371 (c)(1), (2), (4) Date: Feb. 4, 2002

(87) PCT Pub. No.: WO00/56104

PCT Pub. Date: Sep. 21, 2000

(30) Foreign Application Priority Data

Mar. 17, 1999 (DE) ................ 199 11 938

(51) Int. Cl.
*H04Q 7/20* (2006.01)
*H04M 11/00* (2006.01)
*H04B 1/38* (2006.01)

(52) U.S. Cl. .............. 455/440; 455/432.1; 455/443; 455/444; 455/408; 455/435.1; 455/558

(58) Field of Classification Search ........... 455/446, 455/410, 33.2, 33.1, 432.1, 443, 440, 444, 455/447, 408, 558, 435.1; 342/357; *H04Q 7/36*
See application file for complete search history.

(56) References Cited

U.S. PATENT DOCUMENTS

| | | | | |
|---|---|---|---|---|
| 5,155,689 A | * | 10/1992 | Wortham | 455/456.3 |
| 5,396,647 A | * | 3/1995 | Thompson et al. | 455/440 |
| 5,568,153 A | * | 10/1996 | Beliveau | 342/357.1 |
| 5,678,186 A | | 10/1997 | Lee | |
| 5,802,468 A | * | 9/1998 | Gallant et al. | 455/422.1 |
| 5,844,522 A | * | 12/1998 | Sheffer et al. | 342/457 |
| 5,945,949 A | * | 8/1999 | Yun | 342/457 |
| 6,018,653 A | * | 1/2000 | Hietalahti et al. | 455/406 |
| 6,212,390 B1 | * | 4/2001 | Rune | 455/456.6 |
| 6,216,007 B1 | * | 4/2001 | Havinis et al. | 455/456.2 |
| 6,233,448 B1 | * | 5/2001 | Alperovich et al. | 455/417 |
| 6,321,090 B1 | * | 11/2001 | Soliman | 455/440 |
| 7,379,739 B2 | * | 5/2008 | Rajkotia et al. | 455/439 |

(Continued)

FOREIGN PATENT DOCUMENTS

DE  4317143  12/1994

(Continued)

OTHER PUBLICATIONS

"Ein Telefon Und Eine Rufnummer Für Zuhause und Unterwegs" Internet, "Online!" Mar. 18, 1999 XP 002134924.

*Primary Examiner*—Fan Tsang
*Assistant Examiner*—Lisa Hashem
(74) *Attorney, Agent, or Firm*—Dilworth & Barrese LLP

(57) ABSTRACT

A communications system for mobile telecommunications and a set of procedures for operating the system are described. The system allocates a sub-area within a total area whereby the parameters of the allocated sub-area are stored in a subscriber identity module (SIM), enabling authorisation checks to be carried out from a mobile user unit.

3 Claims, 5 Drawing Sheets

U.S. PATENT DOCUMENTS

| | | | |
|---|---|---|---|
| 2005/0186972 A1* | 8/2005 | Ogino et al. | 455/457 |
| 2007/0004454 A1* | 1/2007 | Schweiger et al. | 455/558 |
| 2008/0026733 A1* | 1/2008 | Jaatinen | 455/414.2 |
| 2008/0153483 A1* | 6/2008 | Abu-Amara | 455/432.1 |

FOREIGN PATENT DOCUMENTS

| | | |
|---|---|---|
| DE | 4343335 | 6/1995 |
| DE | 4420462 | 12/1995 |
| DE | 4424558 | 1/1996 |
| DE | 19618531 | 10/1997 |
| DE | 19729425 | 2/1998 |
| DE | 19709407 | 9/1998 |
| DE | 19713965 | 10/1998 |
| DE | 19731461 | 12/1998 |
| DE | 19731461 C1 * | 12/1998 |
| JP | 10-145867 | 5/1998 |
| WO | 96/39000 | 12/1996 |

* cited by examiner

SPECIFICATION OF A COMMUNICATION SYSTEM FOR MOBILE TELECOMMUNICATIONS

BACKGROUND OF THE INVENTION

The invention described concerns a communications system for mobile telecommunications and a set of procedures for operating the system.

Up to now no technology is being used by any of the known mobile telecommunications systems which operate for example in the GSM mode (Global System for Mobile Communications) for finding the exact location of a mobile telephone or any other user unit. This means that a subscriber to whom a subscriber number is allocated can be permanently reached within the total area served by the corresponding switching unit, the so called provider.

Hence, when the total area in question covers several adjacent countries and requires a large number of cells for transmitting the information, high charges must be made for each chargeable tariff unit as the charge made for the communications between mobile user units is independent of the distance between the subscribers. In addition, within a GSM mobile communications system, only approximate information concerning the location of a subscriber can be made available. This information is on the whole determined by the inherent organisation of the switching unit. In the inactive mode, i.e. when the subscriber is not carrying out a conversation or the mobile user unit is sending no updating information, the mobile communications network can only ascertain in which area the customer was last located—the area predetermined by the switching unit. And this area predetermined by the switching unit is usually extremely large, i.e. with a diameter of from several kilometers to 100 km, and covers often the geographical area of several area codes and often is subject to changes as a result of dynamic mobile communications network planning. A location which is changing as a result of the subscriber's movements and hence those of his mobile user unit can as a result of the parameters used up to now simply be used in the active mode, i.e. during a conversation, to locate the user units. Because of their method of operation the communications systems used up to now, however, are not suitable for determining in the inactive mode the position of the user units and hence indicating to the subscriber his current position.

SUMMARY OF THE INVENTION

For this reason the invention in question sets out to provide a communications system or a set of procedures for operating the communications system which can offer the user—in addition to the advantages of mobile communications—a telephone service which in every respect is the equal to that offered by traditional fixed network operations.

Furthermore it sets out to provide a communications system which does not require costly hardware changes.

From the point of view of the equipment used these aims are met by the features herein and from the point of view of the procedures, the features herein. In keeping with this invention at least one subscriber area is defined within the given total area—served by the switching unit—and the subscriber area is served by this switching unit, and at least one subscriber number is allocated to the subscriber area. Via this sub-division of the total area the following is accomplished: Within the subscriber area a tariff can be set which is lower or modified compared to the tariff for the total area—or a special service can be provided with which the subscriber, for example, can telephone at a lower price. Furthermore sub-dividing the total area and having at least one subscriber area, to which at least one subscriber number is allocated, enables for example the subscriber to be shown when he is within the subscriber area concerned and when he leaves it. Because of the unambiguous allocation of the subscriber telephone numbers to the subscriber area it is also ensured that for example existing regulations can be met. In addition this means, for example, that a subscriber can use his mobile user unit within the subscriber area for both at home and in the office without having to use individually set passing on procedures as was traditionally necessary. The passing on procedures in force up to now are extremely cumbersome to use and therefore are not used b) every subscriber. Owing to the fixed predetermined subscriber area, in accordance with this patent application, the switching unit permits the subscriber, for example, to operate several mobile user units at the same time. Each one of these can be charged at a more favourable tariff when used within the subscriber area and, for example, the allocated subscriber number has been dialled. Communications between two mobile user units used within one subscriber area can take place in the traditional way, i.e. a preference can be allocated to one mobile user unit and in case this mobile unit does not respond the message will be passed on to the second mobile unit after a particular number of signals has been registered.

Further practical modes of operation are described in the sub-sections of the claim.

If, in accordance with the feature herein, for example it is intended to have four subscriber areas the advantage is attained that, once again, within the subscriber area each form of service provided by the switching unit can be used at a reduced tariff, whereby the communications between the subscriber areas can also be allocated a special tariff for this purpose. In connection with this it is advantageous, for example, to allocate one sub-area to a zone for the subscriber's home (so-called HOMEZONE) and a second subscriber area to a business zone (so-called OFFICEZONE). As a result of this allocation the switching unit can provide the subscriber with a special service, which is specially adapted to how he normally uses the communications system.

If in accordance with the features herein it becomes possible to have selected subscriber areas overlapping, a flexible operation is possible for choosing the size of the individual subscriber areas. In this way, for example, a further urban zone (so-called CITYZONE) can be allocated as a second subscriber area, whereby this urban zone can for example also include the home zone, in connection with which a special set of tariffs can be offered from the switching unit.

If, in accordance with the features herein, every subscriber area is allocated a different usage priority, the switching unit or the subscriber can, for example, select individually which subscriber area should be used for a telephone call or other form of communication. (The selection is based on a predetermined priority.) In this way the subscriber can, for example, carry out an allocation with respect to the external telephone numbers, which can be previously determined. And this allocation can, for example, structure the ensuing charges according to the different tariffs.

If, in accordance with the features herein, the various subscriber areas and, where applicable, the usage priorities are entered or saved in the subscriber identity module (SIM) the utilisation of the switching unit will be correspondingly reduced as the entry/storage procedure only has to be carried out when the activating takes place. In addition the subscriber can, for example, on his own account chance the priority with respect to the various subscriber areas on his mobile user unit without mating a connection to the switching unit.

If, in accordance with the features herein, the subscriber area comprises several cells, the cell will be selected with which the best quality of transmission is attainable. If, within the subscriber area several mobile user units are being operated or being served, special forms of connection are available.

If for example, in accordance with the features herein, two subscriber numbers are allocated to the subscriber area, whereby the first number is meant as the mobile subscriber number and the second number, for example, as the number in the fixed network, it would make no difference to the tariff whether the subscriber is called via the mobile subscriber number or via the number in the fixed network.

As a result of the transmitting mechanisms set by the switching unit it can occasionally occur that a delay arises in the transmission when a sub-area has been newly defined or when the area is being left. In order to avoid this, in accordance with the features herein, the subscriber identity module will, for example, be fitted with an ancillary store (cache), whereby for very subscriber area a storage area can be identified in advance which corresponds to the cells (possibly defined previously defined by the subscriber) of the subscriber area. A comparison between a cell belonging to a subscriber area and a newly recognised cell can in this way be carried out within the user mobile user unit and has no influence on the transmission or the communication respectively. Should for example a cell of a predetermined sub-area be recognised the corresponding sub-area can then be allocated to the mobile user unit or be displayed on the mobile user unit respectively.

It has been shown to be advantageous, in accordance with the features herein, to define the subscriber area via a point location and a radius centred on this point. In this way a circle is produced around the point location which, for example, can correspond to the current position of the mobile user unit. Once the point location and radius are determined it is checked which cells are located within the circle thus defined, whereby the cell is selected which has the best transmission quality.

As the cell density can vary throughout the total area of the switching unit, in accordance with the features herein, the point radius can be determined after fixing the point location via sampling several cells which are situated in the vicinity of the point location. Fixing the point locations ensures that if the cell density is low the subscriber areas will be so defined that within each subscriber area at least one cell is included with sufficient transmission quality or that the required quantity of cells is attained. The quantity of cells can be predetermined from the switching unit.

If for example, in accordance with the features herein, additionally a fixed station is provided for within the subscriber area, the telephone number used for the standard telephone network can be allocated as the second telephone number for the subscriber, whereby the personal number can also be used as the personal mobile user unit number for the mobile subscriber number. Hence, in this simple way, both the subscriber and those wishing to reach him only have to note or remember a single telephone number.

If, in accordance with the features herein, provision is made for the mobile user unit to have a display which shows whether the mobile user unit is within the subscriber area, it is signalled to the subscriber whether be is telephoning at a lower tariff or at a more expensive tariff. And also whether he is getting a special service on not. The technical checking facility can not only be used in the active mode, i.e. during a conversation but also, due to the defined subscriber area, at other times too.

If, in accordance with the features herein, the communications system is fitted with a first and second flag the first flag can be used, for example, to signal whether the mobile user unit for the subscriber area has an authorisation dependent upon the switching unit. The second flag can be used to show whether an allocation has occurred for the subscriber area. Using the GSM with these two flags it is, for example, determined in advance whether the subscriber is authorised for the serviced reached via the communications system as defined in this patent application and hence can enjoy the advantages of this. If the second flag can be used for preventing that the subscriber area already predetermined is deleted or activated again. This form of usage of the two flags is particularly advantageous when the mobile user unit is used for activating the communications system as defined in this patent application.

If, in accordance with the features herein, the subscriber area is defined by the switching unit the subscriber does not have to make any settings for himself and can, for example, use the subscriber area defined by the switching unit. In other words, the subscriber can begin to use the mobile user unit straight away.

Defining a point location which for example can refer to a street in which the subscriber has either his private address or his business address ensures that, in accordance with the features herein, by using a graphic information system (GIS) and observing the fact that within the radius of this location point several cells are included the individual subscriber areas still be defined taking account of the cell density. The mutual storage of the point location and the corresponding radius, both in a switching unit file and in the mobile user unit subscriber identity module ensures that the subscriber areas can be checked both from the switching unit directly and from the mobile user unit, also directly, and will be identified without further communication or data interchange at a later time, for example when the charges are calculated. As a general rule, in accordance with this application, the point location can be defined as a geographically known fixed point. The crossroads nearest to the subscriber and also the areas defined by the postcodes (translator's note: German post codes have five digits) are particularly suitable for this.

If, in accordance with the features herein, the subscriber area is defined via the mobile user unit, a high degree of flexibility is available to the subscriber, depending on where he lives, in choosing the subscriber area.

If, in accordance with the features herein, the individual procedures described in this claim are used when defining the subscriber area these are particularly of interest for the switching units which either have no access to a graphic information system or do not wish to have this access.

If, in accordance with the features herein, the square of the point location radius is transmitted to the subscriber identity module calculations are no longer necessary for the mobile user unit and hence energy is saved, in particular for determining whether a newly activated cell lies within the subscriber area.

In accordance with the features herein it can be shown whether the mobile user unit is in the subscriber area. In this way the subscriber is continually informed whether he could telephone at a more favourable tariff.

For the case that, resulting from a movement of the mobile user unit in the selected subscriber area a change is made from an addressed cell to a new cell and whether the mobile user unit remains within the subscriber area, it will be checked in an appropriate way, in accordance with the features herein, whether the new cell lies the within the defined user area. In addition, in a first step the difference value $\Delta x$ between the new cell with respect to the x-coordinate and the X-coordinate $(z, B, x_c)$ of the predefined location point $(X_H)$ is defined and in the same way the difference value $\Delta y$ is calculated between the y-coordinates $$\Delta x = |(x_H - x_c)|$$

$$\Delta y = |(y_H - y_c)|$$

As soon as one of these values is, for example, larger than 100 km it is assumed that the new cell is outside the subscriber area. This procedure is carried out to avoid the possibility of an arithmetical overflow within the mobile user unit. In the second step, which is carried out if the result of the first step is negative, the square of the distance between the coordinates of the new cell and the point location is calculated according to Pythagoras' theorem:

$$d^2 = (y_H - y_c)^2 - (x_H - x_C)^2$$

Should the value of the calculated distance $d^2$ be smaller than the value of the predefined or computed location radius $r^2$ then the new cell is a cell within the subscriber area. It can in addition be checked whether the new cell has already been written to file for every subscriber area. If the new cell already appears in this file no further step is required. Otherwise the new cell will be written to file for the subscriber areas storage. These calculations are carried out for each of the defined subscriber areas, whereby the complete calculation is carried out preferably starting with the subscriber area with the highest usage priority and finishing with the area with the lowest. However no further comparison is made as long as a cell is found which belongs to a subscriber area, in this way, for example, it is ensured that, in case subscriber areas overlap, an allocation will be made to the subscriber area with the highest priority.

The computation method described above can be used with advantage for determining a correct tariff, in particular for calculating the charges.

If, in accordance with the features herein, it is permanently displayed which subscriber area is activated the subscriber is signalled to which subscriber area he would make a connection and the corresponding usage priority.

If, in accordance with the features herein, it is guaranteed that when the mobile user unit is located within the subscriber area the information arriving is passed on, for example, to an answering machine or to a so-called voice mail. In this way in it is ensured that whoever is trying to reach the subscriber can transmit him the information.

If, in accordance with the features herein, the possibility is provided that the definition of the subscriber areas can be made several times and/or with differing cells then, for example, the requirements of the subscriber can be individually met or alternatively—in the face of varying initial conditions—the individual sub-units can be adapted without significant technical effort.

Further useful versions are described in the remaining sections of the features herein.

BRIEF DESCRIPTION OF THE DRAWINGS

For better understanding the following section contains detailed descriptions of functional versions of the communications system as described in this patent application. Reference is made to the enclosed drawings.

DESCRIPTION OF THE PREFERRED EMBODIMENTS

Figure 1:
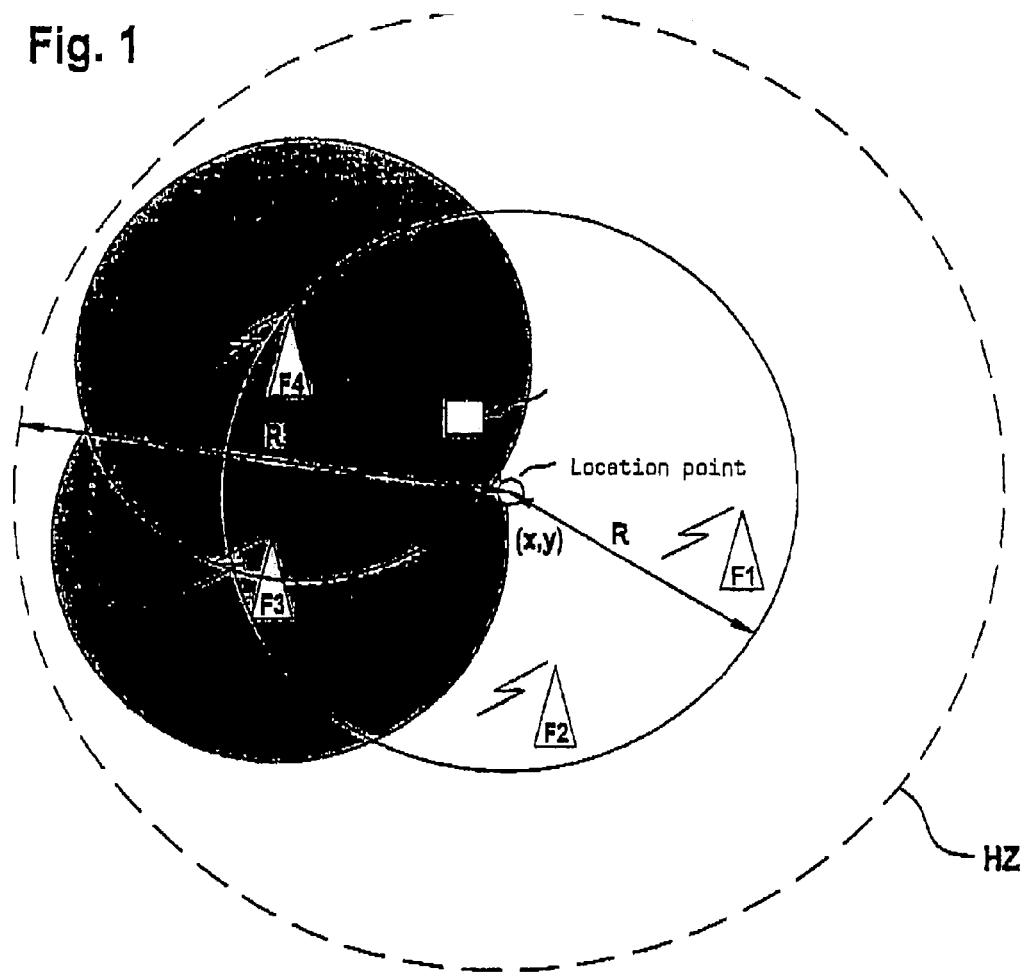
FIG. 1 shows a total overview, in accordance with this patent application, of the allocation of the subscriber areas within the total area.

FIG. 1 illustrates in general terms the communications system as defined in this patent application. Within the total area I, of which the boundaries conform to national borders, the area (HZ; dotted line) is selected which is defined via a location point (x, y) with a radius r. Within this subscriber area HZ there are as a rule several cells F1, F2, F3 F4, whereby the area corresponding to each cell F3 and F4, is shown with dark shading. In the case shown in FIG. 1 the user unit is not exactly at the point location. If the user unit ME, similar to a fixed station, were permanently at the location shown (with a square) then the voice communication or transmission of information would occur via the cell F4. In the case however in which the mobile user unit ME moves within the subscriber area, the information is transmitted in each case from one cell to another. This is described in more detail later. It can also be seen in FIG. 1 that as a result of the distribution or the density of the cells adjacent to the current subscriber area, which for example can be described as the so-called "home zones", a so-called logical "home zone" "is defined, which is situated in only one area. All the cells normally within the total subscriber area are also within this latter area. It should be emphasised here that the subscriber is informed only about the current "home zone" or the current subscriber area. In this way a special tariff can be offered to the subscriber within this subscriber area.

Figure 2:
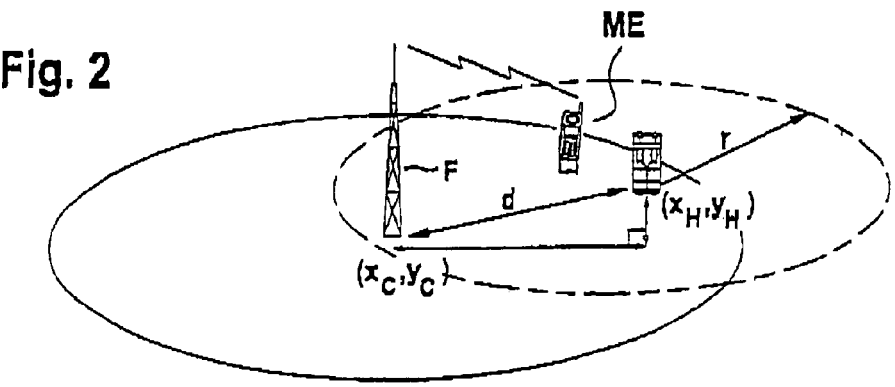
FIG. 2 is a diagram of the checks carried out when a mobile user unit is situated within the subscriber area.

It, is made clear in FIG. 2 how the test is carried out to check whether an mobile user unit is within a subscriber area or a home zone respectively. In this case following data is used: the x or y-coordinates of the location point $(x_H, y_H)$ along with the radius r which defines the subscriber area or home zone, which for example are stored in the subscriber identity module (SIM) of the mobile user unit. The check to ascertain whether the mobile user unit is within the subscriber area takes place in such a was that the x- or y-coordinates $(x_c, y_c)$ of the cell F used for the transmission can be found, for example, in the parameters from, for example, the standardised transmission. As these values are also stored in the mobile user unit this unit can check independently and without additional information (which would have to be transmitted from the switching unit) whether the mobile user unit is within the subscriber area. The check consists of computing the difference using coordinates and the absolute value of this difference is checked whether it is larger than a predefined value, for example 100 km. If the result of the check is negative the distance between the location point and the cell is also computed, via the squares of the difference values (Pythagoras' theorem) and this square value is compared with the square of the location radius as stored in the subscriber identity module. If the computed square, $d^2$, of the distance is smaller or equal to the square, $r^2$ of the location radius the mobile user unit is within the subscriber area. On the basis of this example it is clear that it is advantageous to store the square of the location radius for the subscriber area, in the subscriber identity module, in addition to the coordinates of the location point so that this module (SIM) does not need to carry out any additional computation, i.e. computing the square of the location radius.

Figure 3:
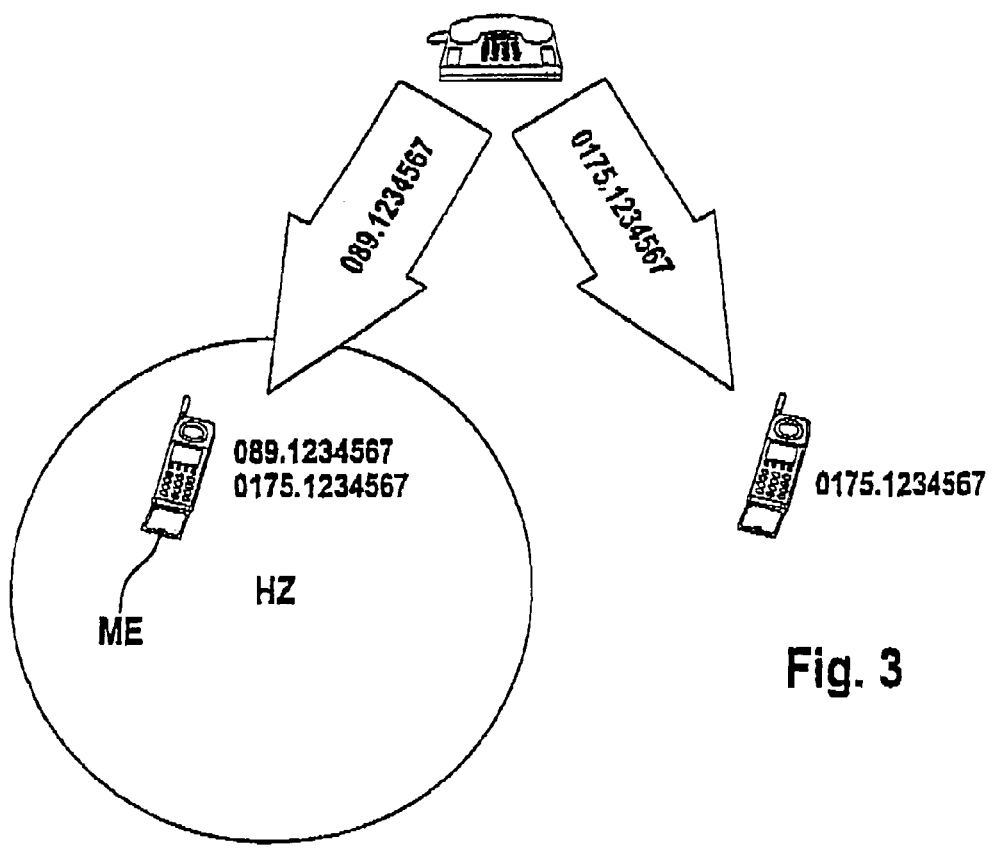
FIG. 3 is a diagram showing the possibilities of allocating both a telephone number of the fixed network and a mobile telephone number to a mobile user unit.

In FIG. 3 the case is illustrated of the subscriber wishing to continue using his usual standard telephone number, i.e. the umber for the traditional fixed network, in addition to his mobile telephone number for a mobile user unit. As a result of this duplicated allocation it makes no difference for those wishing to reach the subscriber whether they choose the number for the fixed network or a mobile telephone number as long as the mobile user unit in ME is within the subscriber area HZ. However it is signalled to the person calling the subscriber whether the subscriber is within the subscriber area when he answers the call via the standard telephone number. As a result of this possibility a complete change-over from, for example, the fixed network station to the mobile communications network can be carried without any further problems and without any noticeable additional changes for the subscriber—he can keep both telephone numbers.

Figure 4:
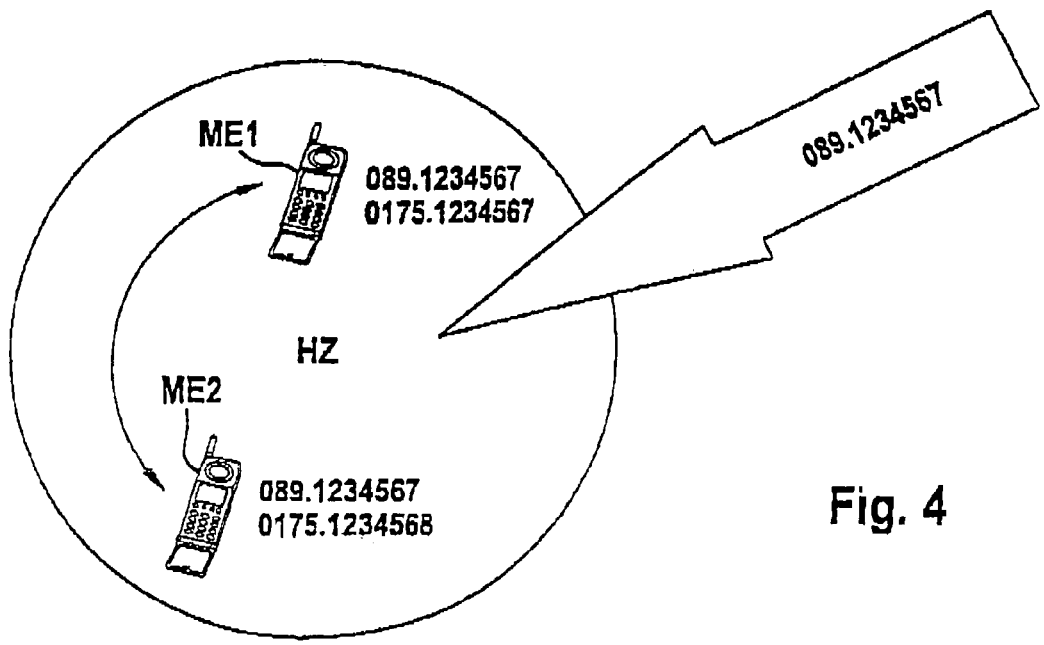
FIG. 4 shows the usage possibilities, in accordance with the patent application, of the allocation with two mobile user units within a subscriber area.

A further method of operation is illustrated in FIG. 4. In this case, for example, a partner configuration is required, i.e. two mobile user units can be contacted either by the standard telephone number or via the mobile telephone number. If for example a call is made by the standard number then, according to the setting, either both mobile user units respond at the same time or on one of the units already has a reference determining that this one should be contacted first. The communications system, in accordance with the patent application, ensures in this case that, for example, switching from one mobile user unit ME1 to another ME2 within the subscriber area occurs at no cost as every mobile user unit is continually polled to ascertain whether it is within the subscriber area HZ. A special service can be offered to subscribers within this partner configuration independent of external calls. This service includes, for example, the feature that telephone calls can be made within the subscriber area HZ at no cost.

On the other hand both the mobile user units can be switched in such a way that each unit basically has two different mobile telephone numbers but can be reached via the same standard telephone number. By means of this option the possibility is given to those who wish to contact one of the other partners, either by selecting the standard telephone number contacting both partners at the same time or—by selecting the respective mobile telephone number—contacting one partner individually. In this case too, switching between the two mobile user unit is possible if one of the two units does not respond.

Figure 5:
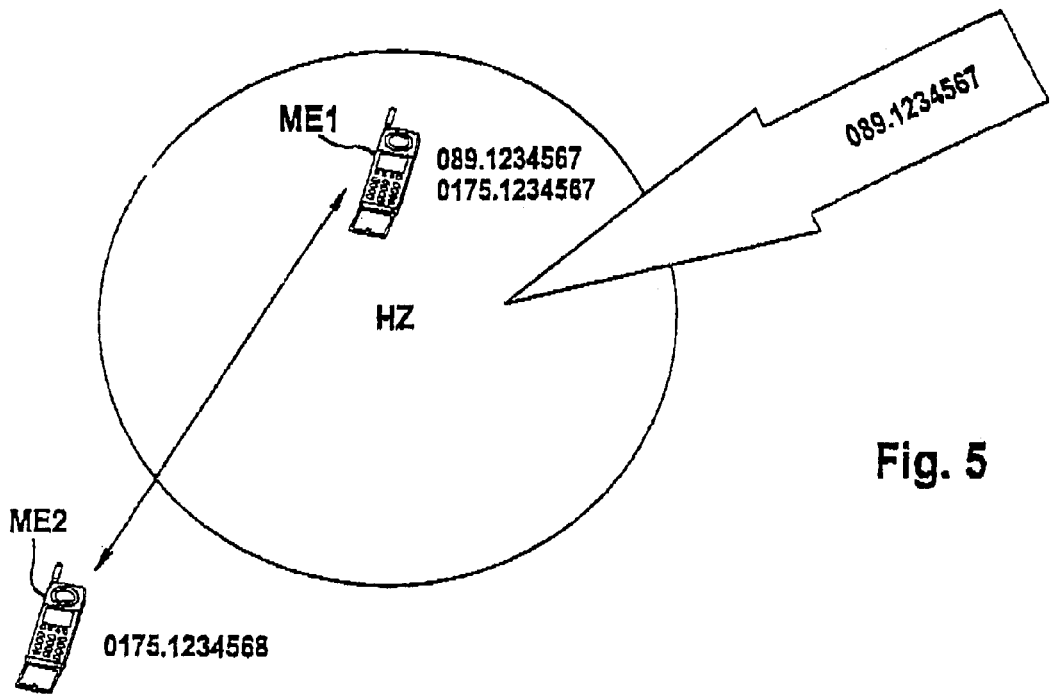
FIG. 5 shows the possibilities of usage when one mobile user unit is within a subscriber area and one mobile user unit is outside the area.

In FIG. 5 the case is described where, for example, one of the partners is within the subscriber area HZ and the other partner is outside this area. If, for example, in this case the standard telephone number is selected the mobile user unit is contacted. If this mobile user unit makes no response then after a predetermined interval or a predefined number of signals the conversation is passed on to the second mobile user unit ME2 or to the voicemail activated for this subscriber area.

The communications system as defined in this patent application ensures that the tariff allocation can be precisely controlled by means of the allocation of a subscriber area. Also considerable freedom is granted to the subscriber with regard to when he would like to communicate and with which configuration.

Figure 6:
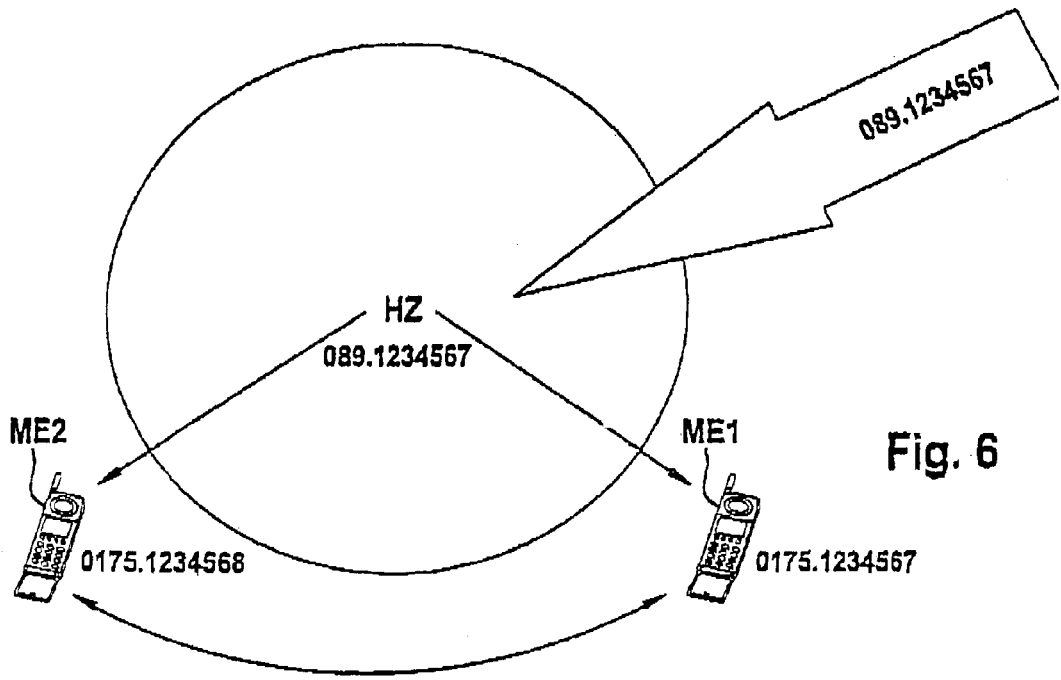
FIG. 6 shows the case when both mobile user units are outside the subscriber area.

In FIG. 6 the case is illustrated where both the mobile user units are outside the subscriber area. In spite of that, using the standard telephone number, the call can be passed on either by activating the voicemail or by transmitting using traditional transmission procedures—either to both mobile user units, if both of these units have the same mobile telephone number, or simply to one predetermined mobile user unit if the partner mobile user units have differing mobile telephone numbers.

Figure 7:
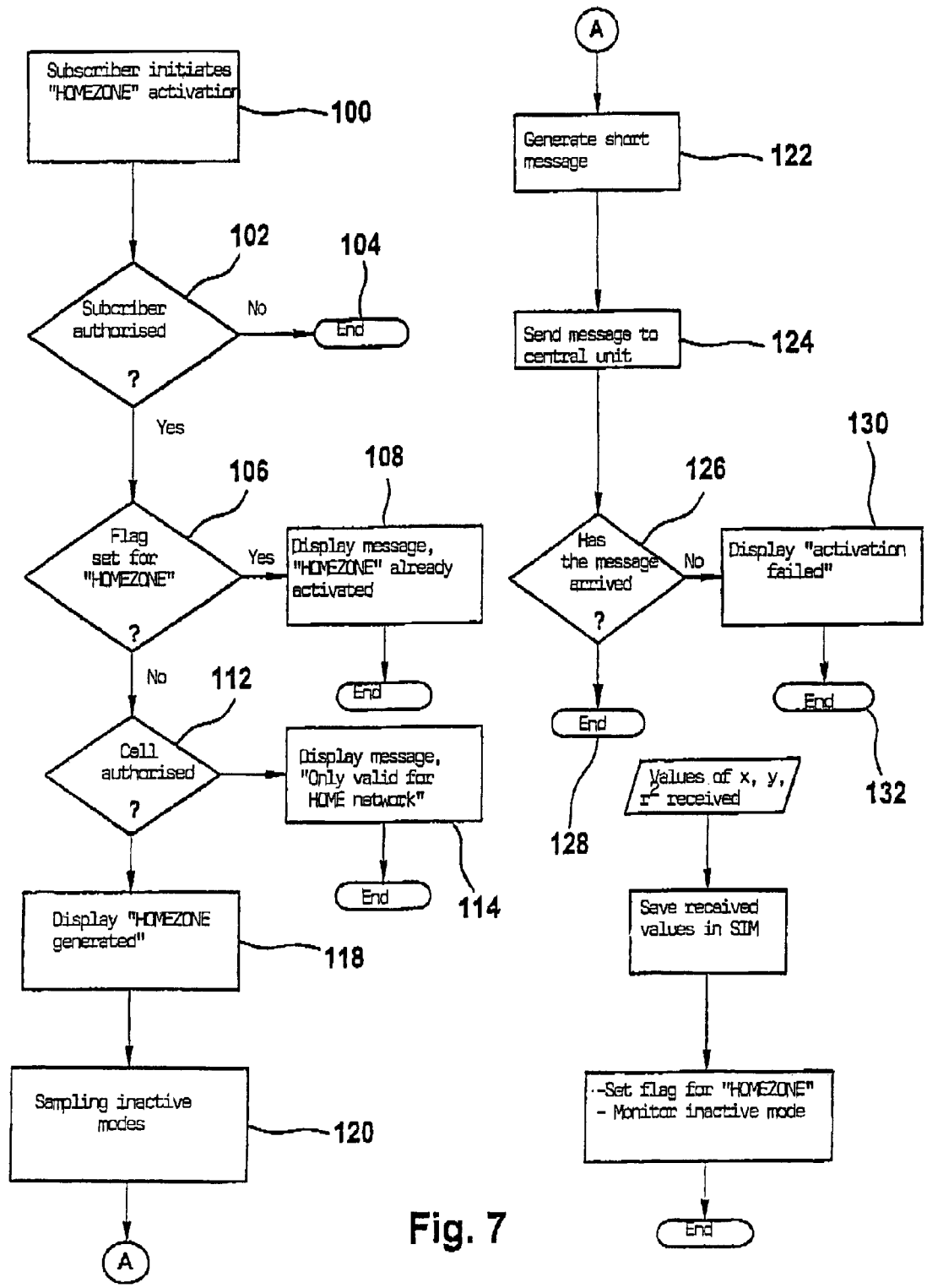
FIG. 7 shows a flowchart representing the activating process.

In FIG. 7 a flowchart is show which represents activating the subscriber area or the "home zone" HZ in an appropriate manner.

The starting point in this case is that activating can be carried out from the mobile user unit itself. The activating procedure is started by selecting the activating program within the mobile user unit menu (step 100). After initiation it will be checked, in step 102, whether the subscriber is authorised to activate the communications system as defined in this patent application, i.e. the subscriber has already registered at the switching unit that he would like to use the communications system as defined in this patent application. Should the result of this check be negative then the activating procedure is terminated, in step 104. If the result is positive it will be checked, in step 106, whether a first flag has already been set, which indicates that the subscriber area has already been selected. If the result of this check is positive the subscriber is signalled by the mobile user unit (step 108) that the subscriber area has already been selected. Subsequently the activating procedure is terminated, in step 110. If the result of the check in step 106 is negative it is checked, in step 112, whether an authorisation is on file in the subscriber identity module for the use of the corresponding switching unit. If the result of this check is negative the subscriber is signalled by the mobile user unit that the activating procedure is only possible within the network predetermined by the switching unit (step 114). Subsequently the activating procedure is terminated, in step 116.

If the result of the check in step 112 is positive the subscriber will be signalled at the mobile user unit that the allocation of the subscriber area is being carried out and will continue until the subscriber area parameters have been received (step 118). Once the allocation has been successfully completed it will be detected (in step 120) which cells are within the subscriber area. Preferably the subscriber area will be defined once six cells have been found. If less than six cells can be found the subscriber is signalled that the allocation for the subscriber area was not successful. After the subscriber area has been defined the relevant data along with the cells found will be transmitted as a short item of information to a central location of the switching unit (steps 122 and 124). In step 126 it is then checked whether this short item of information has been transmitted successfully. If the result of the check is positive the activating procedure of step 128 is terminated. Otherwise, in step 130, the subscriber is signalled that the activating has failed and has been terminated in step 132. If the activating could not be carried out successfully two short items of information are transmitted from the switching unit to the mobile user unit, the first information including the old x-, y- and r-data.

After the subscriber area has been defined, the x-or y-co-ordinates and also the square of the location radius of the selected subscriber area are written to file simultaneously in the subscriber identity module (SIM) of the mobile user unit. The first flag, which specifies whether a subscriber area has been selected, is activated.

It should be emphasised at this point that, after activating, it will be continually checked, both in the active mode end also in the inactive mode of the mobile user unit, whether the mobile user unit is within the subscriber area.

As is to be expected, a new definition or allocation of the subscriber area is only possible if the subscriber contacts the switching unit, which then resets the corresponding parameters in order to make activating possible at another place. In this case the switching unit transmits also the basic settings for the x- or y- and $r^2$-values, deletes all the allocated cells for the subscriber area and de-activates the second flag so that the subscriber can activate a new subscriber area at another location.

Figure 8:
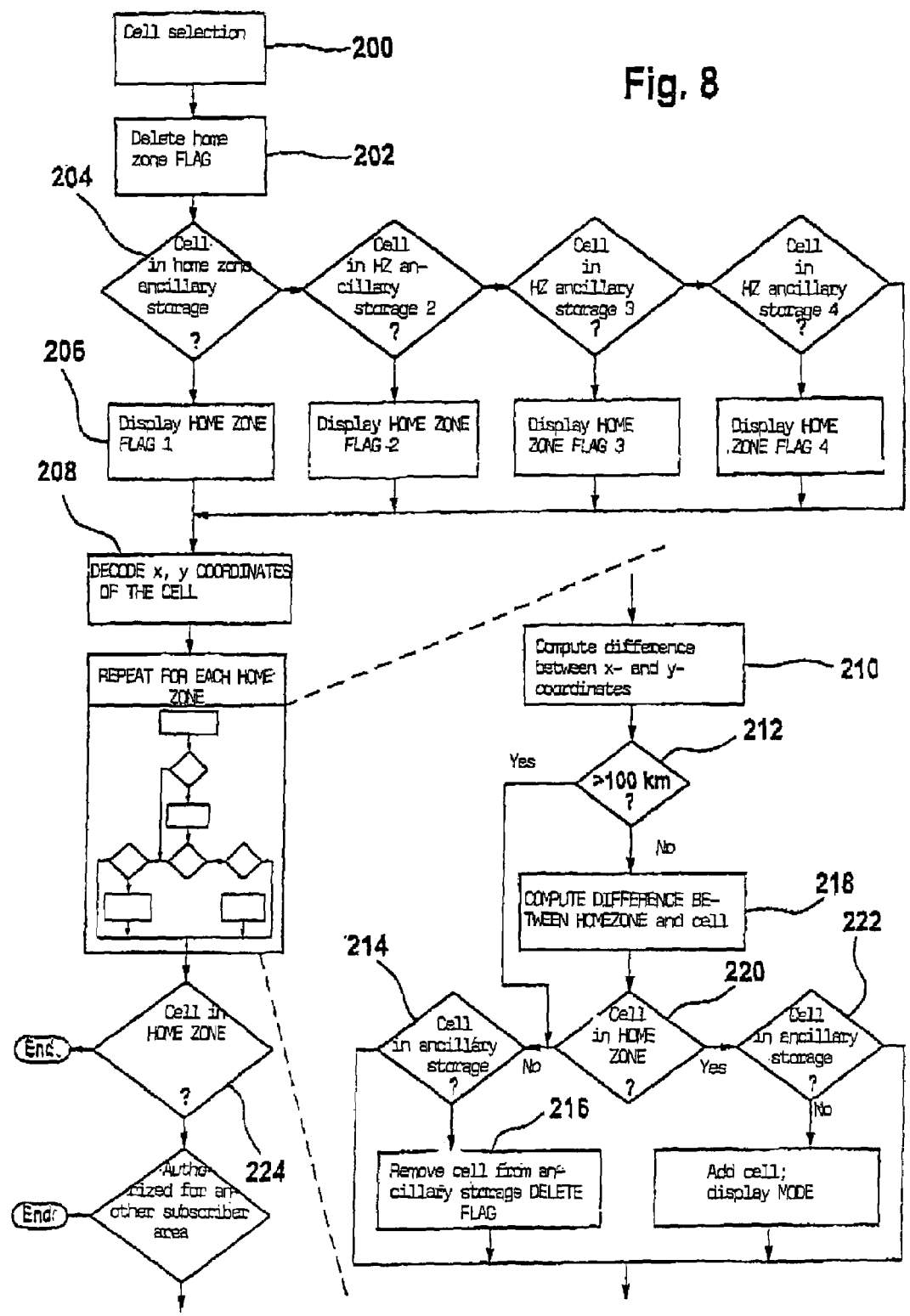
FIG. 8 shows a flowchart for the case when several subscriber areas are used with ancillary storage.

FIG. 8 is a flow chart which shows the set of procedures concerning the check carried out in the inactive mode as to whether the mobile user unit is within the pre-selected subscriber area. The starting point of this flow chart is querying continually whether, as a result of a movement, the mobile user unit has moved to a new cell, i.e. whether a new cell selection has taken place (step 200). In step 202, first of all, each displayed message in the mobile user unit is deleted. That is the message with the information as to whether the mobile user unit is within the subscriber area. The flow chart of FIG. 8 uses the communications system as defined in this patent application with preferably four ancillary storage units allocated to each sub-area. In step 204 it is checked whether the new cell is already on file, in the first ancillary store and with the highest priority. If this is the case it is shown, in step 206, that the mobile user unit has been allocated to the first subscriber area, which corresponds to the new cell. Should the result of the query in step 204 be negative it will be checked whether the new cell was written to file in the second ancillary storage unit. If this is so it will be displayed that the mobile user unit will be activated for the next subscriber area. If this query mode has been carried out in steps 204 and 206 for every subscriber area or home zone the x- and y-coordinates of the new cell from the standardised transmission signal will be decoded (208). In step 210 the difference between the allocated location and a new cell is computed for every allocated home zone or subscriber area using the relevant coordinates. It is checked, in step 212, whether the absolute value of the difference is larger than the predetermined value, e.g. 100 km. If this is the case it is checked whether the new cell has been written to file in the ancillary store in the course of step 214. If this is the case the new cell is removed from the ancillary storage and the first flag of the subscriber area is deleted. If, in step 212, it is established that one of the difference values is not larger than 100 km, the distance between the point location and the cell is calculated (218). It is then checked, in step 220, whether the cell is situated in the subscriber area. If the answer is negative we continue to step 214. If the result of the check of step 220 is positive it is then checked whether the cell as been written to the ancillary store (222). If the answer to this query is negative this cell is added to the ancillary store and it is displayed that the cell is within the subscriber area. If the answer to the query in step 222 is positive we continue with step 224. In step 224 it is checked whether the new cell is located within the subscriber area or the home zone. If so the process shown in the flow chart is completed.

At this point we can continue as well if, for example, a further two subscriber areas can be defined, e.g. subscriber areas like city zone or office zone, which can comprise several previously defined subscriber areas. In this case the standard check is whether the subscriber is authorised to use the further two subscriber areas.

Depending on the cell density it has been found that on average the subscriber areas have a diameter of approximately 500 to 1000 m.

It should be emphasised at this point that the possibilities of usage shown in FIGS. 4 to 6 for two mobile user units are also applicable for more than two mobile user units.

The invention claimed is:

1. A method for operating a communication system for a mobile radio telephone system, which comprises the following steps:
   providing a network unit with an overall area;
   stipulating at least one subscriber area within its overall area, and
   allocating at least one subscriber number in the subscriber area, wherein
   the overall area incorporates at least one radio cell that transmits a signal containing coordinates to a mobile user unit within the system,
   a calculation is performed to determine whether the transmitted coordinates for the radio cell lie within the stipulated subscriber area,
   the subscriber area is stipulated by a user unit, and
   the subscriber area is stipulated by
   a) checking a first and second code, wherein the first code signals whether the user unit is authorized in the subscriber area, and the second code signals whether a stipulation has already taken place relative to the subscriber area;
   b) selecting the radio cells present around the user unit based on signal strengths;
   c) recording the radio cell currently used for switching;
   d) determining urban network code and cell code (cell ID) based on the recorded radio cell;
   e) transmitting the urban network code and cell code to a centralized point of the network unit and simultaneously storing address of the centralized point in a subscriber code (SIM);
   f) determining location and local radius based on a file provided in a centralized point containing all radio cells;
   g) generating a subscriber file within the centralized point, which is write protected;
   h) transmitting the location and local radius to the subscriber code module of the user unit; and
   i) updating the location and local radius stored in the user unit.

2. A communication system for a mobile radio telephone system having at least one network unit which serves a predetermined overall area, comprising
   at least one subscriber area within this overall area stipulated and having allocated at least one subscriber number,
   at least one radio cell arranged in the overall area to transmit a signal containing coordinates to a mobile user unit within the system, and
   means for calculating whether the coordinates transmitted by the radio cell responsible for transmission lie within the subscriber area, wherein
   said mobile user unit comprises a subscriber code module in which coordinates and a radius of said at least one subscriber area is stored, and
   said calculating means additionally determine whether absolute difference between the coordinates transmitted by the radio cell and said at least one subscriber area exceed a predetermined value, and if the predetermined value is not exceeded, square of said difference exceeds square of said radius.

3. A method for operating a communication system for a mobile radio telephone system, comprising the steps of providing a network unit with an overall area;

stipulating at least one subscriber area within its overall area, allocating at least one subscriber number in the subscriber area, incorporating, in the overall area, at least one radio cell that transmits a signal containing coordinates to a mobile user unit within the system, performing a calculation to determine whether the transmitted coordinates for the radio cell lie within the stipulated subscriber area, storing coordinates and a radius of said at least one subscriber area in a subscriber code module located within said mobile user unit, calculating and determining whether absolute difference between the coordinates transmitted by the radio cell and said at least one subscriber area exceed a predetermined value, and if the predetermined value is not exceeded, calculating and determining whether square of said difference exceeds square of said radius.

* * * * *